Jan. 1, 1952   F. B. WILLIAMS   2,580,633
BALED HAY LOADER
Filed May 22, 1947   3 Sheets-Sheet 1
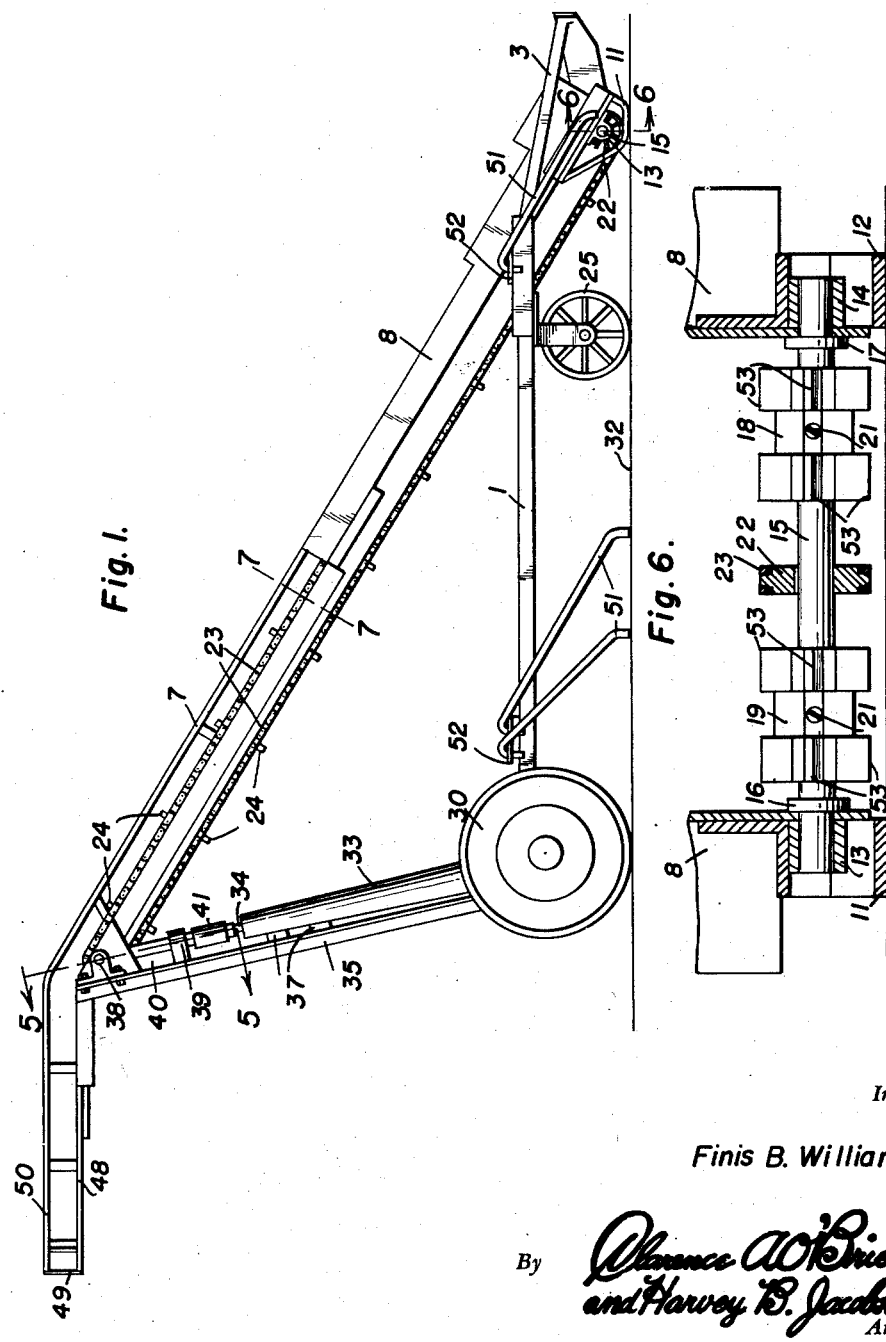
Inventor
Finis B. Williams Jan. 1, 1952     F. B. WILLIAMS     2,580,633
BALED HAY LOADER
Filed May 22, 1947     3 Sheets-Sheet 2
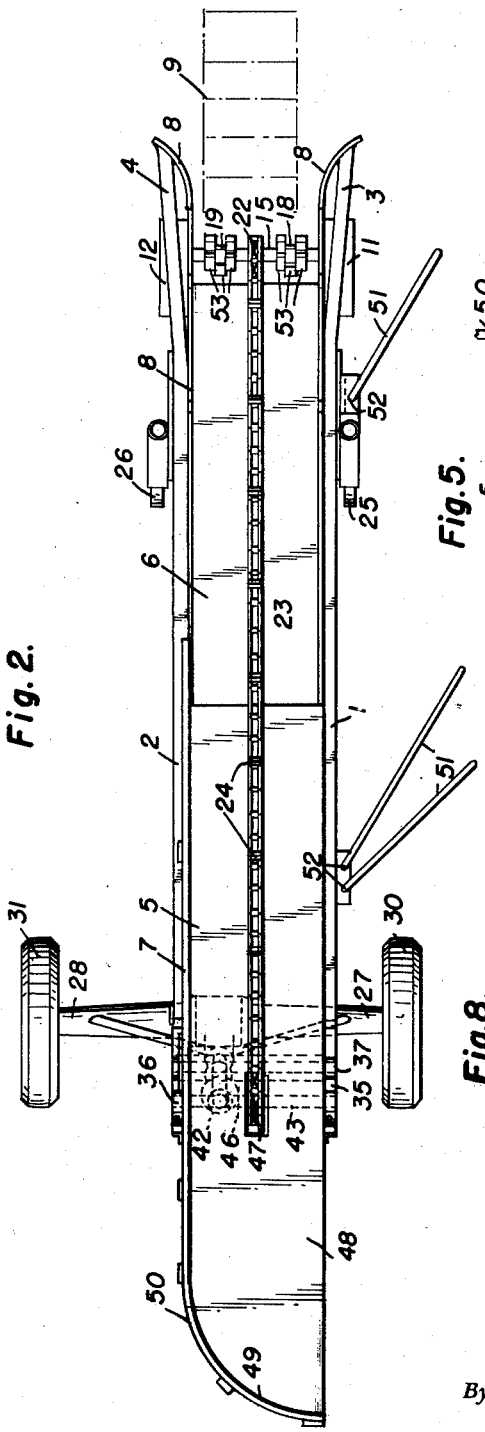
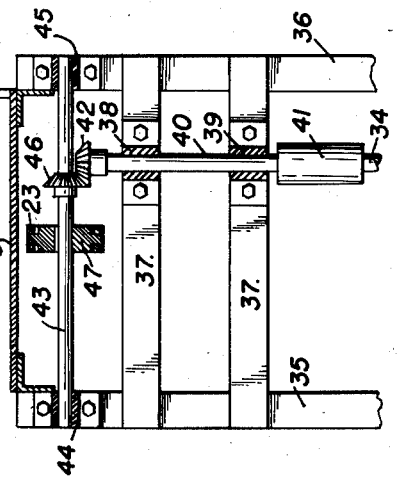
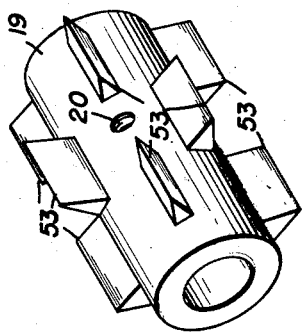
Inventor
Finis B. Williams
By *Clarence A. O'Brien and Harvey B. Jacobson*
Attorneys

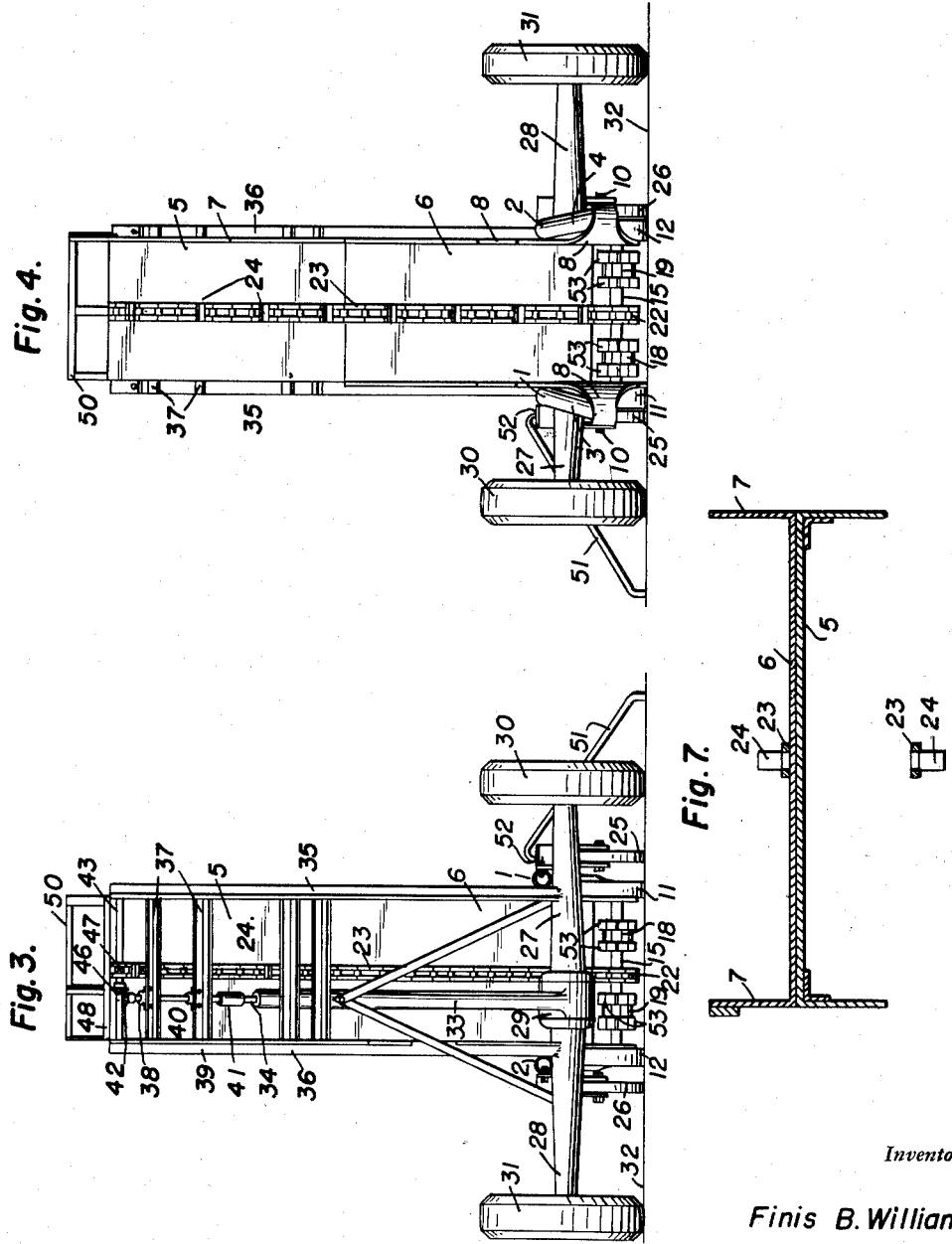

Patented Jan. 1, 1952

2,580,633

UNITED STATES PATENT OFFICE 2,580,633

BALED HAY LOADER

Finis B. Williams, Fresno, Calif.

Application May 22, 1947, Serial No. 749,676

4 Claims. (Cl. 198—9)

This invention relates to improvements in baled hay loaders.

An object of the invention is to provide an improved baled hay loader including a wheel supported frame upon which an upwardly and rearwardly extending chute is mounted, terminating in a discharge platform having means for discharging bales of hay laterally from said platform into a wagon to which the loader will be attached, said wagon and loader being drawn side by side as a unit by any suitable tractor or other form of hauling means.

Another object of the invention is to provide an improved baled hay loader which will be wheel supported and geared to operate by the rolling contact of said wheels upon the ground, said loader including an upwardly and rearwardly extending loading chute having an endless chain conveyor disposed thereon, said chute being provided with transversely extending rotary tubular loading members at its lower end, and gearing connected with the rear end of said chain conveyor for continuously operating the same as long as said loader is in motion.

Another object of the invention is to provide an improved baled hay loader including a wheel supported frame having laterally extending attaching arms adapted to be secured to a laterally positioned wagon for simultaneously moving the loader and wagon as a unit, said loader having an upwardly and rearwardly extending loading chute with an endless chain conveyor disposed longitudinally thereof, being driven by gearing connected to and driven by the rear wheels of the said loader, together with a discharge platform disposed at the upper end of said chute and provided with guiding means thereon for directing the bales of hay after having been moved up said chute upon said platform in a lateral direction to drop into the body of said wagon.

A further object of the invention is to provide an improved baled hay loader which will be highly efficient in operation, and relatively inexpensive to manufacture and produce.

Other objects will appear as the description proceeds.

In the accompanying drawings which form a part of this application:

Figure 1 is a side elevation of the improved baled hay loader;

Figure 2 is a plan view of the improved baled hay loader;

Figure 3 is a rear elevation of the improved baled hay loader;

Figure 4 is a front elevation of the improved baled hay loader;

Figure 5 is a sectional view taken on the line 5—5 of Figure 1;

Figure 6 is a sectional view taken on the line 6—6 of Figure 1;

Figure 7 is a sectional view taken on the line 7—7 of Figure 1; and

Figure 8 is a perspective view of one of the tubular loading members.

Like characters of reference are used throughout the following specification and the accompanying drawings to designate corresponding parts.

In carrying out the invention, there is provided an improved baled hay loader including a substantially rectangular frame having parallel longitudinally extending frame members 1 and 2 which are flared laterally at their forward ends as at 3 and 4.

An elongatable loading chute is provided and comprises upper and lower chute sections 5 and 6 which are provided with the oppositely disposed guard rails or side boards 7 and 8 respectively, said upper section 5 overlying the lower section 6, as clearly illustrated in Figures 2 and 4 of the drawings. The lower side rails or boards 8 are stepped to assist in guiding the bales of hay 9 into their proper loading positions upon the lower end of the chute, said rails or boards 8 being laterally and arcuately curved outwardly to be attached by means of the bolts 10 to the forward ends of the frame members 1 and 2.

Oppositely disposed depending ground engaging shoes 11 and 12 are supported by the forward and lower end of the chute 6, and provide bearings 13 and 14 for the cross shaft 15. Thrust collars 16 and 17 are formed adjacent the opposite ends of the shaft 15, and a pair of tubular loading sleeve members 18 and 19 are also supported upon the shaft 15 adjacent the thrust collars 16 and 17.

The baled hay loading sleeve member 18 and 19 are provided with radially extending threaded bores 20 for receiving the locking set screws or bolts 21 which clamp against the shaft 15 for securing the sleeve members 18 and 19 in fixed position upon said shaft 15.

A sprocket wheel 22 is secured centrally upon the shaft 15, and is adapted to support the forward end of the endless chain conveyor 23 which is formed with the spaced upwardly extending spurs or studs 24 for engaging the bales of hay 9 for moving the same up the chute when loaded thereon by the loading sleeve members 18 and 19 while the chain conveyor and loader are in motion and in operation.

A pair of forwardly disposed swivel guide wheels 25 and 26 are supported upon the frame members 1 and 2, while axle housings 27 and 28, and a differential housing 29 are supported at the rear end of said frame members 1 and 2. Rubber tired wheels 30 and 31 are supported upon axles (not shown) within the axle housing 27 and 28, being adapted to engage the ground 32, to furnish the power for operating or driving the endless chain conveyor 23 as the loader is drawn along the ground.

A propeller shaft housing 33 is attached to the differential housing 29 and supports a propeller shaft 34 connected with the usual differential gearing (not shown) within the housing 29.

An upwardly and rearwardly extending frame having side members 35 and 36 and cross connecting members 37 is welded or otherwise suitably attached to the axle housings 27 and 28, as clearly illustrated in Figure 3 of the drawings.

Spaced bearings 38 and 39 are supported upon adjacent cross connecting members 37 for rotatably supporting the short shaft section 40, which is connected with said propeller shaft 34 by means of the coupling 41, and supports a beveled gear 42 upon its upper or opposite end.

An upper transversely extending shaft 43 is mounted in the bearings 44 and 45 at the upper end of the side frame members 35 and 36, and supports a beveled gear 46 which is adapted to intermesh with the beveled gear 42 and to be driven thereby. A sprocket wheel 47 is secured centrally upon the shaft 43 and supports the upper end of the endless chain conveyor 23, whereby movement of the wheels 30 and 31 along the ground 32 will drive the endless chain conveyor 23 to move said chain with the hay bale engaging spurs 24 upwardly from the front or lower end of the chute to the upper or rear end thereof.

The upper end of the chute terminates in a rearwardly extending hay bale discharge platform 48 whose rear end is rounded as at 49, and is provided with the upstanding arcuate baled hay directing fence or rail 50, whereby when the bales of hay 9 are moved onto the platform 48 from the chute, they will engage the upstanding directing rail 50 and will be moved laterally of said platform to the flat unprotected side thereof where they will be discharged or dropped into a wagon (not shown) which will be disposed along side the loader and attached thereto by means of a laterally extending inverted U-shaped attaching arms or rods 51, which are pivoted at 52 to the loader at their inner ends so that the hooked outer ends may be secured in any desired supporting means (not shown) upon the wagon (also not shown), for pulling the loader and wagon in side by side relation as a single unit when attached to a suitable tractor.

The tubular loading sleeve members 18 and 19 are provided with the staggered longitudinally extending teeth 53 of triangular shape in cross section, whereby when the loader is pulled to a bale of hay 9, the bale will be picked up by the teeth 53 on the rapidly rotating loading sleeve members 18 and 19, to be deposited on the lower end of the loading chute, whereupon the upwardly extending spurs or studs 24 on the moving endless chain conveyor 23 will move the bale of hay 9 up the chute and deposit the same upon the discharge platform 48, to be pushed therefrom by the next bale or bales of hay into a laterally disposed wagon (not shown) suitably attached to said loader.

From the foregoing description, it will be apparent that there has been devised and provided a highly efficient baled hay loader which will be attachable to a wagon to be drawn thereby, and which will be self-loading, requiring no separate prime mover for operating the same. If the loader is to be used separately and in a fixed location or position, being not attached to a laterally positioned wagon, a small motor or engine (not shown) may be attached to the loader frame and connected to the endless chain conveyor 23 for operating the same.

The preferred embodiment of the instant invention has been illustrated and described, and it will be understood that it is not intended to limit the scope of the invention thereto, as many minor changes in detail of construction may be resorted to without departure from the spirit of the invention.

Having described the invention, what is claimed as new is:

1. A baled hay loader comprising a frame having front and rear supporting wheels, said front wheels being of caster type a rearwardly inclined loading chute attached to the front end of said frame, an upwardly extending frame supported by said rear wheels connected with the rear end of said loading chute, an endless chain conveyor disposed for operation in said loading chute and having a shaft operatively mounted transversely of said front end of the frame, driving gearing between said rear wheels and said endless chain conveyor for operating said conveyor when said loader is in motion, and aligned rotatable tubular baled hay engaging and loading sleeve members mounted at the forward end of said loading chute, said sleeve members being spaced apart with one sleeve member on each side of the endless chain conveyor, said sleeve members being driven by said endless chain conveyor, said sleeve members having staggered teeth extending longitudinally of the sleeve members.

2. A baled hay loader comprising a frame having front and rear supporting wheels, said front wheels being of caster type a rearwardly inclined loading chute attached to the front end of said frame, an upwardly extending frame supported by said rear wheels and having connection with the upper end of said loading chute, transverse shafts at the opposite end of said loading chute, sprocket wheels on said shafts, an endless chain conveyor disposed in said loading chute supported between said sprocket wheels, driving gearing between said rear wheels and said endless chain conveyor for operating said conveyor when said loader is in motion, rotatable tubular baled hay engaging and loading sleeve members on the forward and lower transverse shaft, said sleeve members being spaced apart with one member on each side of said chain conveyor and being driven by said endless chain conveyor, said sleeve members having staggered teeth extending longitudinally of the sleeve members.

3. In a baled hay loader having an ambulant frame with a loading chute, a driven cross shaft on the lower end of the chute, horizontally spaced rotary and tubular baled hay engaging and loading sleeve members fixed on said shaft, said sleeve members having staggered teeth, each tooth being triangular in vertical cross-section and extending longitudinally of the sleeve members.

4. In a baled hay loader having an inclined chute with an endless chain conveyor extending longitudinally and centrally of the chute, a driven cross shaft at the lower end of the conveyor, baled hay engaging and loading sleeve members fixed to said shaft, one member on each side of said conveyor, said members having staggered teeth triangular in vertical cross-section and extending longitudinally of the members.

FINIS B. WILLIAMS.

REFERENCES CITED

The following references are of record in the file of this patent:

UNITED STATES PATENTS

| Number | Name | Date |
|---|---|---|
| 1,306,597 | Krogen | June 10, 1919 |
| 1,570,256 | Hunt | Jan. 19, 1926 |
| 1,705,336 | Pape | Mar. 12, 1929 |
| 2,093,721 | Grattan | Sept. 21, 1937 |
| 2,335,924 | Elholm | Dec. 7, 1943 |
| 2,400,086 | Hansen | May 14, 1946 |
| 2,402,465 | Templeton | June 18, 1946 |
| 2,408,863 | Lisota | Oct. 8, 1946 |
| 2,491,232 | Turnbull | Dec. 13, 1949 |
| 2,495,647 | Vaughn et al. | Jan. 24, 1950 |
| 2,518,083 | Sims | Aug. 8, 1950 |
| 2,525,870 | Crofoot | Oct. 17, 1950 |
| 2,540,791 | Lowe et al. | Feb. 6, 1951 |